United States Patent [19]

Sica, Jr.

[11] Patent Number: 4,475,792
[45] Date of Patent: Oct. 9, 1984

[54] HIGH RESOLUTION DIFFRACTION GRATING

[75] Inventor: Louis Sica, Jr., Alexandria, Va.

[73] Assignee: The United States of America as represented by the Secretary of the Navy, Washington, D.C.

[21] Appl. No.: 402,403

[22] Filed: Jul. 27, 1982

[51] Int. Cl.³ .............................................. G02B 5/18
[52] U.S. Cl. .......................... 350/162.17; 350/162.22; 350/162.23; 356/305
[58] Field of Search ........ 356/305, 328, 302, 331–334; 350/162.17, 162.2, 162.21–162.23

[56] References Cited

U.S. PATENT DOCUMENTS 2,339,053  1/1944  Coleman ........................ 356/334 X
3,034,398  5/1962  Barnes et al. .................. 356/332 X
3,658,424  4/1972  Elliott .
3,883,221  5/1975  Rigrod .

FOREIGN PATENT DOCUMENTS 312534   5/1929  United Kingdom .
706711  12/1979  U.S.S.R. ............................ 356/334

OTHER PUBLICATIONS

Aoyagi et al., *Optics Communications*, vol. 29, No. 3, Jun., 1979, pp. 253–255.
Hugh L. Garvin, E. Garmire, S. Somekh, H. Stoll and A. Yariv, "Ion Beam Micromachining of Integrated Optics Components" *Applied Optics*, vol. 12, No. 3; Mar., 1973; pp. 455–459.
E. G. Loewen, M. Neviere and D. Maystre "Grating Efficiency Theory as it Applies to Blazed and Holographic Gratings" *Applied Optics*, vol. 16, No. 10; Oct., 1977 pp. 2711–2721.

*Primary Examiner*—F. L. Evans
*Attorney, Agent, or Firm*—Robert F. Beers; William T. Ellis; Charles E. Krueger

[57] ABSTRACT

An optical prism, with an input surface, a reflecting surface and a base, and with a diffraction grating formed on the reflecting surface. The prism is designed so that if an input beam is incident normal to the input surface, then the efficiency of the order diffracted in the direction opposite the input beam is greater than a predetermined value. If the prism is fabricated of a material with index of refraction n, then the resolving power of the grating is increased by n.

8 Claims, 6 Drawing Figures

HIGH RESOLUTION DIFFRACTION GRATING

BACKGROUND OF THE INVENTION

This invention relates to spectrographic instruments in general and more particularly pertains to high resolution diffraction gratings.

High resolution spectrographic instruments are required in many systems, for example IR modulators or chemical analyzers, requiring compact, rugged components. The most commonly used high resolution instruments are interferometers and diffraction gratings. Interferometers generally tend to be fragile and bulky thereby limiting their utility in the above-described systems. Diffraction gratings are rugged but heretofore the width of the grating had to be large in order to achieve high resolution. However, size restrictions imposed by a particular application may limit the resolving power of the grating. Additionally, as the size of the grating is increased the cost of the grating increases prohibitively due to the high-precision techniques required to manufacture the grating.

OBJECT OF THE INVENTION

Accordingly, it is an object of the present invention to increase the resolving power of a diffraction grating without increasing its width.

SUMMARY OF THE INVENTION

The above and other objects are achieved in the present invention which comprises an optical prism with a diffraction grating formed on one surface. The prism is designed so that if an input beam is incident normal to the input surface then the efficiency of the order diffracted by the grating in a direction opposite to the direction of the input beam is greater than a predetermined value. If the prism is fabricated of a material with index of refraction n, then the resolving power of the grating is increased by a factor of n.

BRIEF DESCRIPTION OF THE DRAWINGS

A more complete appreciation of the invention and many of the attendant advantages thereof will be readily obtained as the same becomes better understood by reference to the following detailed dscription when considered in connection with the accompanying drawings, wherein.

DETAILED DESCRIPTION OF THE PREFERRED EMBODIMENT

Briefly, the resolving power of a grating is defined as $\lambda_1/d\lambda_{min}$ where $d\lambda_{min}$ is the minimum wavelength difference that can be measured by the grating and $\lambda_1$ is the wavelength of the input beam. The quantity $d\lambda_{min}$ is directly proportional to $\lambda_1$ and inversely proportional to the width of the grating, W or $$d\lambda_{min} = C\lambda_1/W$$

where C is a constant.

In the present invention a diffraction grating is formed on the surface of an optical prism. A described more fully below, if the prism is fabricated of a material with an index of refraction n then the resolving power of the diffraction grating will be increased by a factor of n.

The invention may utilize either a blazed or a holographic grating. A blazed grating comprises N reflecting faces of width a where the faces are not parallel to the grating plane but are formed at an angle $\gamma$, denoted the blaze angle, with respect to the plane of the grating. These gratings may be formed with ruling machines described in the article by A. R. Ingalls in Sci. Amer., Vol. 186, p. 45 (1952). Holographic gratings generally have profiles sufficiently close to sinusoidal to base calculations on this profile.

Figure 1:
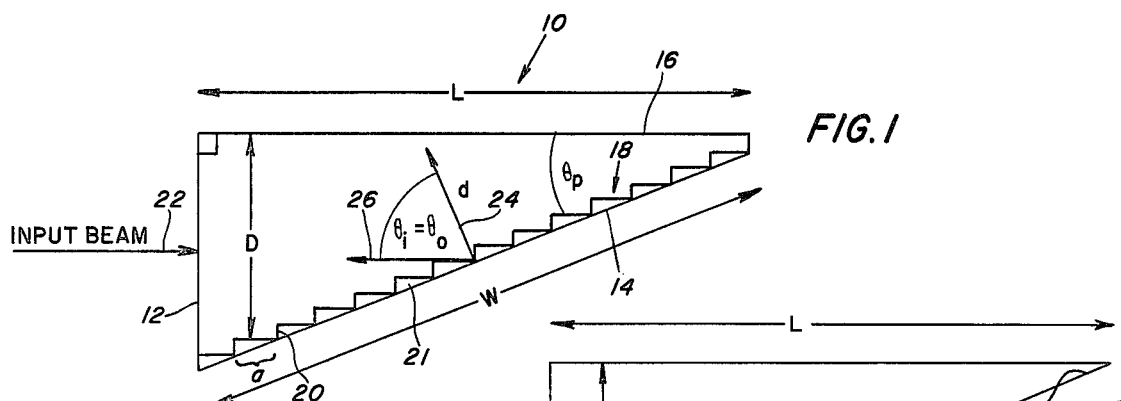
FIG. 1 is a cross-sectional plan view of one embodiment of the invention. Note that the reflecting faces of the grating are not drawn to scale.

Referring now to the drawings, wherein like reference numerals designate identical or corresponding parts throughout the several views, FIG. 1 is a cross-sectional view of the present invention comprising a triangular prism 10 fabricated of the material with an index of refraction equal to n. The prism includes an input surface 12 of width D, a reflecting surface 14 of width W and a base 16 of length L. The base 16 is perpendicular to the input surface 12 and forms an angle $\theta_p$ with the reflecting surface 14. Therefore L and W are related by $$L = W \cos \theta_p \qquad (1)$$

The prism 10 has a blazed diffraction grating 18 formed on the reflecting surface 14. Note that the reflecting faces 20 of the grating 18 are parallel to the input surface 12. Thus an input beam with a first propagation vector normal to the input surface 12 is retroreflected, i.e. is reflected in the direction opposite the first propagation vector, by the grating 18. The width of each reflecting facet 21, a, is related to the total width of the grating, W, and the number of reflecting facets, N by $$W = Na \qquad (1a)$$

The angle of incidence of the input beam $\theta_i$ is defined as the angle formed between the input beam propagation vector 22 and a vector 24 normal to the plane of grating. Since the input propagation vector is oriented perpendicularly to the input surface it is parallel to the base. Thus from the geometry of the prism $$\theta_i = \pi/2 - \theta_p \qquad (2)$$

As stated above, the grating is designed so that input beam is retroreflected. Therefore, most of the input beam energy will be reflected at angle $\theta_r$ where $$\theta_i = \theta_r \qquad (3)$$

From the geometry of FIG. 1 it is clear that $$D = W \sin \theta_p = W \cos [\pi/2 - \theta_p] = W \cos \theta_i = W \cos \theta_r \qquad (4)$$

The width of the input beam is adjusted to be equal to D so that the resolving power of the grating is maximized.

As described below, some of the light from the incident beam will be diffracted in a direction other than $\theta_r$ due to instrument broadening caused by diffraction.

Figure 2:
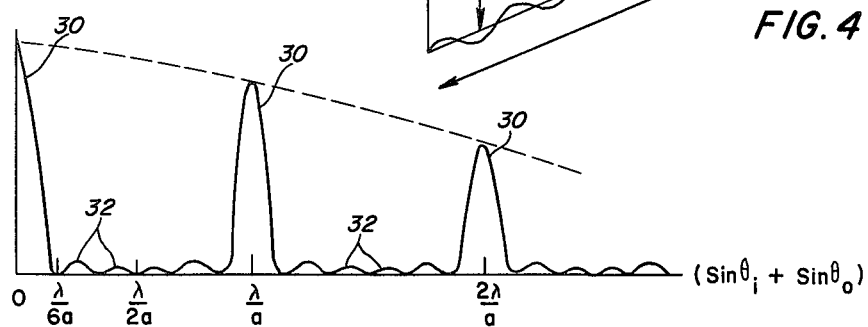
FIG. 2 is a graph of the intensity distribution function of a diffraction grating. The vertical axis represents the intensity of the diffracted light while the horizontal axis represents ($\sin\theta_i + \sin\theta_o$).

In order to describe the operation of the present invention attention is called to FIGS. 2 and 3. The formulae utilized below are well known in the art and are set forth in the book by M. Born and E. Wolf entitled *Principles of Optics*, Fifth Edition, Pergamon Press, Oxford, New York, 1975.

Turning now to FIG. 2, the dependence of the intensity of the output beam diffracted from the grating on the angle of incidence, $\theta_i$, the output angle $\theta_o$, and $\lambda_1/a$ is depicted where $\lambda_1$ is the wavelength of the input beam, $\theta_i$ and a are defined above, and $\theta_o$ is the angle formed between the output beam and the grating normal. Note that since most of the intensity of the input beam is retroreflected by the grating at $\theta_r$, most of the energy of the input beam will be diffracted in the direction $\theta_o = \theta_r = \theta_i$. The functional dependence illustrated in FIG. 2 is denoted the distribution function. Note that the distribution function is characterized by several principal maxima 30 with subsidiary maxima 32 therebetween.

The angular positions of the peaks of the principal maxima 30 are located at $\theta_o = \theta\lambda_1$ where the values of $\theta\lambda_1$ are determined from the formula $$m\lambda_1 = a(\sin \lambda i + \sin \theta\lambda_1) \quad (5)$$

where m is an integer defining the order of a principle maximum. The present invention is constructed so that most of the energy of the input beam is reflected at $\theta_r$. Therefore, from eq. (5), $m_\perp$, the order of the principle maximum for $\lambda_1$, determined by the condition that $\theta\lambda_1 = \theta_r$ is, $$m_\perp = (a/\lambda_1)(\sin \theta_i + \sin \theta_r) = (2a/\lambda) \sin \theta_r \quad (6)$$

where $\theta_i = \theta_r$ (eq. (3)).

Note that the location of a principle maximum is dependent on $\lambda_1$. A small increment in $\lambda_1$, $d\lambda$ induces an angular shift, $d\theta\lambda_1$, in the location of the principle maxima where $$d\lambda = (a/m_\perp) \cos \theta\lambda_1 \, d\theta\lambda_1 \quad (7)$$

and since, as described above, $a = W/N$ and $W \cos \theta_\lambda = W \cos \theta_r = D$ when $m = m_\perp$ (eqs. (1a) and (4))

$$d\lambda = (a/m_1) \cos \theta_{\lambda 1} d\theta_{\lambda 1} = (W \cos \theta_{\lambda 1}) d\theta_{\lambda 1} = (D/Nm_\perp) D t\theta_{\lambda 1} \quad (8)$$

Utilizing the relationships $m = m_\perp = 2a/\lambda_l \sin \theta_{\lambda 1}$ (eq. (6)), $W = Na$, and $L = W\cos \theta_p = W\sin \theta_{\lambda 1}$ (eqs. (1) and (2)) eq. (8) becomes $$d\theta = (Dd\theta_{\lambda 1}/Nm_\perp) = (\lambda_l Dd\theta_{\lambda 1}/2(Na) \sin \theta\lambda 1) = (\theta_1 Dd\theta_{\lambda 1}/2(W\sin \theta_{\lambda 1})) = (\theta_1 D/2L) d\theta_{\lambda 1} \quad (9)$$

Solving eq. (9) for $d\theta_{\lambda 1}$ gives the dependence of $d\theta_{801}$ on $d\lambda$ as:

$$d\theta_{\lambda 1} = 2L/D \, d\lambda/\lambda_1 \quad (10)$$

Unfortunately the principle maxima are not sharply defined but are spread over an angular range, $\Delta\theta_{\lambda 1}$, defined as the angular distance between the peak and null of a principal maximum. $\Delta\theta_{\lambda 1}$ is given by the formula $$\Delta\theta_{\lambda 1} \quad (11)$$

Note that angular width of the principle maxima, $\Delta\theta_{\lambda 1}$, depends on the width of grating, W.

It is the angular spread, $\Delta\theta_{\lambda 1}$, of the principle maxima that limits the wavelength difference, $d\lambda$, that can be measured by a spectrographic instrument.

Figure 3A:
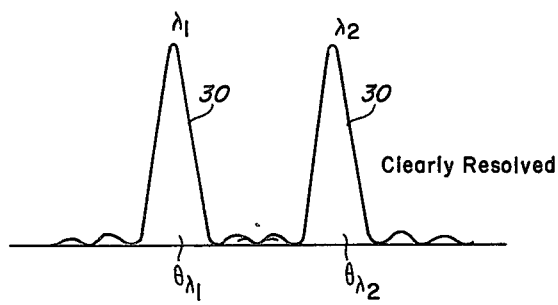
FIG. 3(a), 3(b) and 3(c) are graphical depictions of the angular position of two principle maxima corresponding to $\lambda_1$ and $\lambda_2$ as their difference, $d\lambda = \lambda_2 - \lambda_1$, is decreased.

A formula for determining $d\lambda_{min}$, the minimum wavelength difference that can be measured by a diffraction grating, can be better understood by referring to FIG. 3a, b, and c, schematic diagrams showing the dependence of the position of the principle maxima 30 for two wavelengths, $\lambda_1$ and $\lambda_2$, as their difference, $d\lambda = \lambda_2 - \lambda_1$, is decreased.

In FIG. 3(a) $d\lambda$ is large and the principle maxima do not overlap. An instrument measuring the angular intensity distribution function would detect two maxima 30 corresponding to $\lambda_1$ and $\lambda_2$, at $\theta_{\lambda 1}$ and $\theta_{\lambda 2}$. Knowledge of $\theta_{\lambda 1}$ and $\theta_{\lambda 2}$ enables the values of $\lambda_1$ and $\lambda_2$ to be calculated from eq. (5).

Figure 3B:
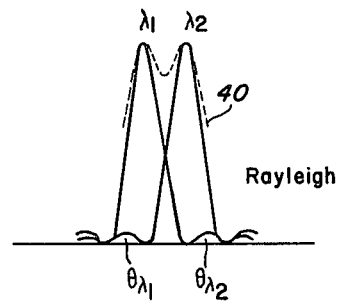
Figure 3C:
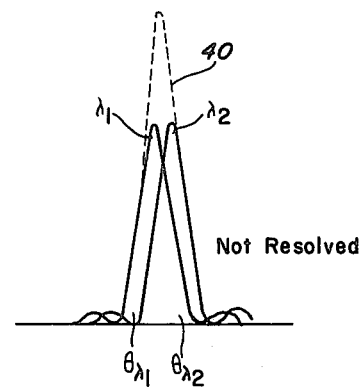

In FIG. 3(b) $d\lambda$ has been decreased so that the principle maxima overlap. An instrument measuring the angular intensity distribution function would measure the sum of the intensities of the principle maxima corresponding to $\lambda_1$ and $\lambda_2$. Note that the dashed line 40 depicting the sum has small peaks at $\lambda_1$ and $\lambda_2$. As $d\lambda$ is further decreased the overlap between the principle maxima increases until only one peak is present as depicted in FIG. 3(c). Since as $d\lambda$ decreases the peaks corresponding to $\lambda_1$ and $\lambda_2$ decrease in magnitude and become more difficult to resolve several arbitrary criteria for the minumum angular separation for which two principle maxima are just resolvable have been developed.

The Rayleigh criterion for resolving two overlapping principle maxima is well accepted. In order for the wavelength difference $d\lambda_{min}$ to be just resovable by the Rayleigh criteria the change in direction of a principle maximum peak due to the wavelength variation, $d\lambda_{min}$, must be equal to half the width of a principle maximum.

The angular displacement of the null of the principle maximum from its peak is given by eq. (11). Thus, the minimum angular separation between principle maxima that can be resolved by the Rayleigh criterion is $$d\theta_{min} = \lambda_1/D \quad (12)$$

The minimal wavelength separation, $d\lambda_{min}$, that will cause the angular separation between principle maximum required by the Rayleigh criterion is determined by setting eq. (10) equal to eq. (12), i.e., $$d\theta_{min} = d\theta_\lambda \quad (13)$$

Note that eqs. (10), (12) and (13) are written for an observer located inside the prism. When the output beam emerges from the input surface of the prism, both the position of the peak of the diffraction pattern given by Eq. (5) and the null given by Eq. (11) will be shifted by Snell's law, $$n \sin \alpha_i = \sin \alpha_o \quad (14)$$

In Eq. (14) $\alpha_i$ and $\alpha_o$ are the angles of incidence with the normal to the input surface for a beam inside and outside the medium respectively, in the case of a medium with refractive index equal to n. For small angles this becomes $$n\alpha_i = \alpha_o \quad (15)$$

Also, since for small angles $d\alpha_i = d\theta_{\lambda 1}$ (inside) and $d\alpha_o = d\theta_{\lambda 1}$ (outside)

$$n\, d\theta_o(\text{inside}) = d\theta_o(\text{outside}) \quad (15A)$$

Note also that the wavelength of the light is different inside and outside the prism where the relationship between the two values is $$\lambda(\text{inside}) = \lambda(\text{outside})/n \quad (16)$$

where n is the index of refraction of the prism material. Since it is $d\lambda_{min}$ (outside) that limits instrument resolving power both the wavelengths and angles in eqs. (7) and (12) must be written in terms of appropriate quantities outside of the prism medium.

Utilizing eqs. (15a) and (16), eq. (10) becomes $$d\theta_{\lambda 1}(\text{outside}) = n\, d\theta_{\lambda 1}(\text{inside}) = (n\, d\lambda(\text{inside})/\lambda_1(\text{inside})) \cdot (2L/D) = (n\, d\lambda(\text{outside})/\lambda_1(\text{outside})) \cdot (2L/D) \quad (17)$$

and eq. (12) becomes $$d\theta_{min}(\text{outside}) = n\, d\theta_{min}(\text{inside}) = (n\lambda_1(\text{inside})/D) = (n\lambda_1(\text{outside})/n D) = (\lambda_1(\text{outside})/D) \quad (18)$$

Now, applying the Rayleigh criterion, eq. (13), to eqs (17) and (18) gives:

$$d\lambda_{min}(\text{outside}) = \lambda^2(\text{outside})/2n\, L \quad (19)$$

A similar calculation for a standard diffraction grating gives $$d\lambda_{min}(\text{standard}) = \lambda^2(\text{outside})/2L \quad (20)$$

Thus, the present invention decreases the minimal wavelength resolvable by a factor of n, thereby increasing the resolving power of a grating by a factor of n.

Figure 4:
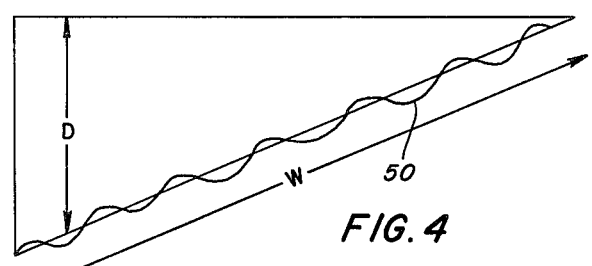
FIG. 4 is a cross-sectional plan view of an alternative embodiment of the invention. Note that the grating is not drawn to scale.

The blazed grating configuration depicted in FIG. 1 is exemplary of only one means for diffracting a high percentage of the energy of the incident beam in the direction perpendicular to the input face. As described above, $m_\perp$ denotes the order of the principle maxima diffracted in the direction perpendicular to the input face. Alternative gratings may be utilized if $\theta p$ is adjusted so that $m_\perp$ is a diffraction order with high efficiency i.e. with a high percentage of the energy of the input beam contained therein. A particular value of the efficiency for the $m_\perp$ order can not be specified herein but is determined by the background noise suppression required of the spectrographic instrument described herein. The higher the efficiency of the $m_\perp$ diffraction order the greater the background noise suppression of the instrument. In particular, holographic grating with sinusoidal modulations may be utilized in the invention. The article by E. G. Loewen et al. entitled "Grating Efficiency Theory as It Applies to Blazed and Holographic Gratings" App. Optics, Vol. 16, No. 10, p. 2711 (Oct. 1977) sets forth the means for calculating the efficiency of blazed and holographic gratings. These calculations allow the correct $m_\perp$ and $\theta_p$ to be determined for particular grating configurations. FIG. 4 is a cross-sectional plan view of an alternative embodiment of the invention utilizing a holographic grating 50.

Since the resolving power of the grating is increased by a factor of n, the present invention is especially useful in the infrared region of the spectrum where the prism may be constructed of high index of refraction materials such as germanium or cadmium telluride with n equal to 4. A holographic grating may be formed on the reflecting surface of a germanium or cadmium telluride prism by ion beam micromachining. This technique is described in the article by H. L. Garvin et al. entitled "Ion Beam Micromachining of Integrated Optics Components" App. Optics, Vol. 12, No. 3, p. 455 (Mar. 17, 1973). The dimensions of the prism and grating will be determined by the bandwidth, resolving power, and free spectral range required for a particular application utilizing optical formulae well understood by persons of ordinary skill in the art.

Obviously, numerous (additional) modifications and variations of the present invention are possible in light of the above teachings. It is therefore to be understood that within the scope of the appended claims, the invention may be practiced otherwise than as specifically described herein.

What is claimed and desired to be secured by Letters Patent of the United States is:

1. A spectographic instrument comprising:
   an optical prism fabricated from a material selected from the group consisting of germanium and cadmium telluride, said prism having an input surface and a reflecting surface, wherein said input surface and said reflecting surface are intersecting planes; and
   a diffraction grating formed on said reflecting surface.

2. The spectrographic instrument recited in claim 1 wherein:
   said diffraction grating is a holographic grating.

3. The spectrographic instrument recited in claim 1 wherein:
   said diffraction grating is a blazed grating.

4. A spectrographic instrument comprising:
   an optical prism fabricated from a material selected from the group consisting of germanium and cadmium telluride, said prism having an input surface and a reflecting surface, wherein said input surface and said reflecting surface are intersecting planes; and
   a blazed diffraction grating formed on said reflecting surface, said blazed grating having reflecting faces, wherein the reflecting faces of said diffraction grating are substantially parallel to said input surface.

5. A spectrographic instrument comprising:
   a triangular prism with an input surface, a base, and a reflecting surface, wherein said input surface and said reflecting surface are intersecting planes; and
   a diffraction grating formed on said reflecting surface wherein said reflecting surface is positioned relative to said input surface so that the efficiency is greater than a predetermined value for the order diffracted by said grating in the direction substantially perpendicular to said input surface, wherein efficiency is defined as the ratio of diffracted energy in a given order to the energy of an input beam.

6. The spectrographic instrument recited in claim 5 wherein:
   said diffraction grating is a holographic grating.

7. The spectrographic instrument recited in claim 6 wherein:
   said triangular prism is fabricated from a material selected from the group consisting of germanium and cadmium telluride.

8. The spectrographic instrument recited in claim 7 wherein:
   said diffraction grating is a blazed grating.

* * * * *